US009601063B2

(12) United States Patent
Yamada et al.

(10) Patent No.: US 9,601,063 B2

(45) Date of Patent: Mar. 21, 2017

(54) DEVICE FOR CONTROLLING DISPLAY APPARATUS, METHOD FOR CONTROLLING DISPLAY APPARATUS, DISPLAY APPARATUS, AND ELECTRONIC EQUIPMENT

(71) Applicant: Seiko Epson Corporation, Tokyo (JP)

(72) Inventors: Yusuke Yamada, Matsumoto (JP); Kota Muto, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 14/387,231

(22) PCT Filed: Mar. 21, 2013

(86) PCT No.: PCT/JP2013/001907

§ 371 (c)(1),
(2) Date: Jan. 7, 2015

(87) PCT Pub. No.: WO2013/140802

PCT Pub. Date: Sep. 26, 2013

(65) Prior Publication Data

US 2015/0123954 A1 May 7, 2015

(30) Foreign Application Priority Data

Mar. 23, 2012 (JP) ................................. 2012-067172

(51) Int. Cl.

*G06F 3/038* (2013.01)
*G09G 5/00* (2006.01)
(Continued)

(52) U.S. Cl.

CPC ..... *G09G 3/344* (2013.01); *G09G 2300/0421* (2013.01); *G09G 2320/041* (2013.01); *G09G 2340/0428* (2013.01)

(58) Field of Classification Search

CPC ........... G09G 3/3688; G09G 2310/027; G09G 3/3648; G09G 3/3611

See application file for complete search history.

(56) References Cited

U.S. PATENT DOCUMENTS

2002/0118183 A1* 8/2002 Inuzuka .................... G06F 3/14 345/204
2003/0112257 A1 6/2003 Tamura
(Continued)

FOREIGN PATENT DOCUMENTS

JP 2000-308097 A 11/2000
JP 2002-055668 A 2/2002
(Continued)

OTHER PUBLICATIONS

Search Report and Written Opinion received in International Application No. PCT/JP2013/001907.
(Continued)

*Primary Examiner* — Alexander Eisen
*Assistant Examiner* — Nan-Ying Yang
(74) *Attorney, Agent, or Firm* — ALG Intellectual Property, LLC

(57) ABSTRACT

A device for controlling a display apparatus includes: an image acquiring portion that acquires first image data containing a tone value of each pixel; a parameter acquiring portion that acquires a parameter for determining a tone used to display an image, from among the tones of the pixel that change in a discrete manner; and a tone reducing portion that determines, in a case of reducing the number of tones to a number of tones smaller than that of the first image data, each tone value after the reduction of the number of tones, according to the parameter acquired by the parameter acquiring portion, and generates second image data in which the number of tones in the first image data acquired by the (Continued)

image acquiring portion has been reduced based on the determined tone value.

6 Claims, 5 Drawing Sheets

(51) Int. Cl.
*G09G 5/10* (2006.01)
*G09G 3/34* (2006.01)

(56) References Cited

U.S. PATENT DOCUMENTS

| | | | |
|---|---|---|---|
| 2003/0147053 A1 | 8/2003 | Matsuda et al. | |
| 2003/0179211 A1 | 9/2003 | Wada et al. | |
| 2003/0193566 A1 | 10/2003 | Matsuda et al. | |
| 2008/0309953 A1 | 12/2008 | Feng | |
| 2009/0058779 A1* | 3/2009 | Yoshihara | G02F 1/13476 345/89 |
| 2009/0073343 A1* | 3/2009 | Kojima | G09G 3/3406 349/61 |
| 2010/0027073 A1 | 2/2010 | Lin et al. | |
| 2011/0029115 A1 | 2/2011 | Ogawa | |
| 2012/0038688 A1 | 2/2012 | Deyama et al. | |
| 2012/0062579 A1 | 3/2012 | Yamada | |

FOREIGN PATENT DOCUMENTS

| | | | |
|---|---|---|---|
| JP | 2003-050572 | A | 2/2003 |
| JP | 2003-162267 | A | 6/2003 |
| JP | 2003-280629 | A | 10/2003 |
| JP | 2003-283961 | A | 10/2003 |
| JP | 2004-070228 | A | 3/2004 |
| JP | 2004-228716 | A | 8/2004 |
| JP | 2005-266162 | A | 9/2005 |
| JP | 2007-329591 | A | 12/2007 |
| JP | 2008-046536 | A | 2/2008 |
| JP | 2008-048165 | A | 2/2008 |
| JP | 2008-066830 | A | 3/2008 |
| JP | 2010-119017 | A | 5/2010 |
| JP | 2010-515926 | A | 5/2010 |
| JP | 2010-237518 | A | 10/2010 |
| JP | 2010-250060 | A | 11/2010 |
| JP | 2011-28070 | A | 2/2011 |
| WO | WO-2007-116438 | A | 10/2007 |
| WO | WO-2008-153209 | A | 12/2008 |

OTHER PUBLICATIONS

European Search Report, Sep. 3, 2015, issued in related Patent Application No. EP-13764070.

* cited by examiner

| | C1 | C2 |
|---|---|---|
| Less than 20°C | 69 | 115 |
| 20°C Or more and less than 30°C | 85 | 170 |
| 30°C Or more | 102 | 205 |

| | | Tone value after change | | | |
|---|---|---|---|---|---|
| | | 255 | C2 | C1 | 0 |
| Tone value before change | 255 | 0 | 5 | 8 | 9 |
| | C2 | 5 | 0 | 3 | 4 |
| | C1 | 8 | 3 | 0 | 1 |
| | 0 | 9 | 4 | 1 | 0 |

FIG. 6A

| | | Tone value after change | | | |
|---|---|---|---|---|---|
| | | 255 | C2 | C1 | 0 |
| Tone value before change | 255 | 0 | 3 | 5 | 6 |
| | C2 | 3 | 0 | 2 | 3 |
| | C1 | 5 | 2 | 0 | 1 |
| | 0 | 6 | 3 | 1 | 0 |

FIG. 6B

| | | Tone value after change | | | |
|---|---|---|---|---|---|
| | | 255 | C2 | C1 | 0 |
| Tone value before change | 255 | 0 | 5 | 8 | 9 |
| | C2 | 5 | 0 | 3 | 4 |
| | C1 | 8 | 3 | 0 | 1 |
| | 0 | 9 | 4 | 1 | 0 |

FIG. 6C

DEVICE FOR CONTROLLING DISPLAY APPARATUS, METHOD FOR CONTROLLING DISPLAY APPARATUS, DISPLAY APPARATUS, AND ELECTRONIC EQUIPMENT

TECHNICAL FIELD

The present invention relates to a device for controlling a display apparatus, a method for controlling a display apparatus, a display apparatus, and electronic equipment.

BACKGROUND ART

Patent Document 1 describes a method for performing dithering on an input gray-scale image, and displaying a dithered image on an electrophoretic display. According to this method, the number of tones in the input gray-scale image is reduced, and, thus, the input gray-scale image can be reproduced in a small number of tones on an electrophoretic display where the number of tones that can be displayed is small.

CITATION LIST

Patent Literature

[Patent Document 1] JP-A-2010-515926 (Tokuhyo)

SUMMARY

In electrophoretic display apparatuses of the active matrix type, a pixel is configured such that a dispersion medium and electrophoretic particles are held between electrodes. When a voltage is applied to the pixel a plurality of times, the electrophoretic particles are moved, so that a tone that is displayed can be changed. However, since the viscosity of the dispersion medium changes in accordance with the temperature, the movement amount of the electrophoretic particles may change in accordance with a change in the temperature even when a voltage is applied to the pixel the same number of times, and the tones that are displayed may not be the same.

For example, if the reflectance ratio is normalized such that the maximum reflectance ratio of light reflected by a pixel (white) is 100% and the minimum reflectance ratio (black) is 0%, there is a case in which a reflectance ratio of 0% is changed to a reflectance ratio of 35% by applying a voltage once and is changed to a reflectance ratio of 70% by applying a voltage twice at a certain temperature, whereas the reflectance ratio is changed to a reflectance ratio of 25% by applying a voltage once and is changed to a reflectance ratio of 60% by applying a voltage twice at a lower temperature. In this case, if differences between tones are made equal and the number of tones is reduced to four so that the reflectance ratios after the reduction of the number of tones are 0%, 33%, 66%, and 100%, in an apparatus that cannot display a tone at 33% as described above, a difference occurs between the tones of an image after the reduction of the number of tones and the tones that can be displayed by the display apparatus, and the quality in displaying the tones deteriorates.

The invention was made in view of the above-described circumstances, and it is an object thereof to suppress, in the case of reducing the number of tones in an acquired image and displaying the thus obtained image, a difference between the image after the reduction of the number of tones and the image that is displayed.

Solution to Problem

In order to achieve the above-described object, the invention is directed to a device for controlling a display apparatus including a plurality of first electrodes provided for respective pixels, a second electrode disposed facing the plurality of first electrodes, and an electro-optical material disposed between the plurality of first electrodes and the second electrode, in which tones of the pixels change in a discrete manner according to the number of times of application of a voltage to the first electrodes, the device including: an image acquiring portion that acquires first image data containing a tone value of each pixel; a parameter acquiring portion that acquires a parameter for determining a tone used to display an image, from among the tones of the pixel that change in a discrete manner; and a tone reducing portion that determines, in a case of reducing the number of tones to a number of tones smaller than that of the first image data, each tone value after the reduction of the number of tones, according to the parameter acquired by the parameter acquiring portion, and generates second image data in which the number of tones in the first image data acquired by the image acquiring portion has been reduced based on the determined tone value.

With this configuration, according to the parameter, the tone value after the reduction of the number of tones can be made close to a tone value corresponding to the tone value of a pixel that changes in a discrete manner. Thus, a difference between the tone after the reduction of the number of tones and the tone that is displayed in the pixel can be suppressed.

The control device may be configured such that the parameter acquiring portion acquires data indicating a temperature as the parameter, and the tone reducing portion determines each tone value after the reduction of the number of tones, according to the temperature indicated by the data acquired by the parameter acquiring portion.

With this configuration, even in a display apparatus in which the tone of a pixel changes in accordance with the temperature, the tone value after the reduction of the number of tones can be made close to a tone value that changes in accordance with the temperature, and, thus, a difference between the tone after the reduction of the number of tones and the tone that is displayed in the pixel can be suppressed.

The control device may be configured such that the tone value after the reduction of the number of tones is determined for each display apparatus.

With this configuration, even when the tones that are displayed are different between a plurality of display apparatuses, the tone value after the reduction of the number of tones is determined for each display apparatus, and, thus, in each display apparatus, a difference between the tone after the reduction of the number of tones and the tone that is displayed in the pixel can be suppressed.

The control device may be configured such that, in a case where the number of tones after the reduction of the number of tones is smaller than the number of tones that can be selected in the display apparatus, a smallest difference between the tones after the reduction of the number of tones is larger than a smallest difference between the tones that can be selected in the display apparatus.

With this configuration, if the number of tones after the reduction of the number of tones is smaller than the number of tones that can be selected in the display apparatus, tone values with which a difference between the tones becomes the smallest are not selected as the tone values after the reduction of the number of tones. Thus, even when the tone of the pixel is repeatedly changed, the relationship between the density levels can be prevented from being disordered.

Also, in order to achieve the above-described object, the invention is directed to a display apparatus including a plurality of first electrodes provided for respective pixels, a second electrode disposed facing the plurality of first electrodes, and an electro-optical material disposed between the plurality of first electrodes and the second electrode, in which tones of the pixels change in a discrete manner according to the number of times of application of a voltage to the first electrodes, including: an image acquiring portion that acquires first image data containing a tone value of each pixel; a parameter acquiring portion that acquires a parameter for determining a tone used to display an image, from among the tones of the pixel that change in a discrete manner; a tone reducing portion that determines, in a case of reducing the number of tones to a number of tones smaller than that of the first image data, each tone value after the reduction of the number of tones, according to the parameter acquired by the parameter acquiring portion, and generates second image data in which the number of tones in the first image data acquired by the image acquiring portion has been reduced based on the determined tone value, and a writing portion that changes the tone of the pixel to a tone of the tone value specified by the second image data generated by the tone reducing portion, wherein, in a case of changing the tone of the pixel from a second tone toward a first tone, a first writing operation is performed that applies a first voltage to the first electrode of the pixel once or a plurality of times, and, in a case of changing the tone of the pixel from the first tone toward the second tone, a second writing operation is performed that applies a second voltage having a polarity different from that of the first voltage to the first electrode of the pixel once or a plurality of times.

With this configuration, the tone value after the reduction of the number of tones can be made close to a tone value corresponding to the tone value of a pixel that changes in a discrete manner according to the parameter, and, thus, a difference between the tone after the reduction of the number of tones and the tone that is displayed in the pixel can be suppressed.

Note that the invention can be applied not only to the device for controlling a display apparatus, and the display apparatus, but also to a method for controlling a display apparatus, and electronic equipment having the display apparatus.

BRIEF DESCRIPTION OF DRAWINGS

FIG. 6 is a diagram showing an exemplary application number table.

DESCRIPTION OF EMBODIMENT

Embodiment

Configuration of Embodiment

Figure 1:
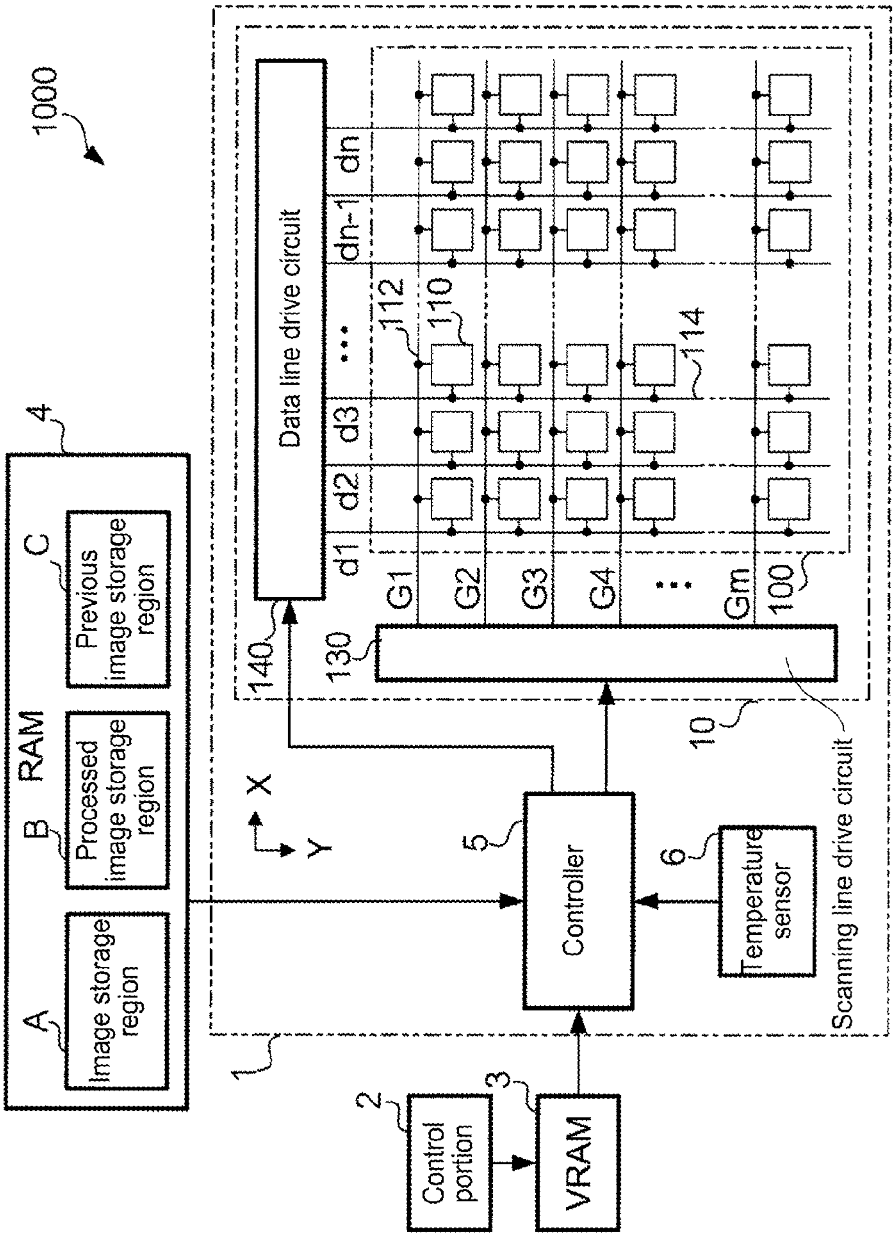
FIG. 1 is a diagram showing a hardware configuration of a display apparatus 1000 and an electro-optical device 1 according to a first embodiment.

FIG. 1 is a block diagram showing a hardware configuration of a display apparatus 1000 according to an embodiment of the invention. The display apparatus 1000 is an apparatus for displaying images, and includes an electrophoretic electro-optical device 1, a control portion 2, a video random access memory (VRAM) 3, and a RAM 4 as an exemplary storage portion. The electro-optical device 1 includes a display portion 10 and a controller 5.

The control portion 2 is a microcomputer including a central processing unit (CPU), a read only memory (ROM), a RAM, and the like, and controls various portions of the display apparatus 1000. The control portion 2 accesses the VRAM 3, and writes, into the VRAM 3, image data indicating an image that is to be displayed in a display region 100.

The controller 5 supplies various signals for displaying an image in the display region 100 of the display portion 10, to a scanning line drive circuit 130 and a data line drive circuit 140 of the display portion 10. The controller 5 corresponds to a device for controlling the electro-optical device 1. Note that the control portion 2 and the controller 5 together may be defined as a device for controlling the electro-optical device 1. Also, the whole of the control portion 2, the controller 5, the VRAM 3, and the RAM 4 may be defined as a device for controlling the electro-optical device 1.

The VRAM 3 is a memory in which image data written by the control portion 2 is stored. The VRAM 3 has storage regions (buffers) in respective pixels 110 arranged in m rows×n columns described later. Image data contains data indicating a tone of each pixel 110. Data indicating the tone of one pixel 110 is stored in one storage region corresponding to that pixel 110, in the VRAM 3. Data written into the VRAM 3 is read by the controller 5. Note that, in image data of this embodiment, a tone value of each pixel is an integer of 0 to 255. The value 0 represents black, and the value 255 represents white, and the tone changes from black toward white as the value increases.

A temperature sensor 6 is a sensor for detecting a temperature. The temperature sensor 6 outputs a signal indicating the detected temperature. The temperature sensor 6 is disposed near the display region 100.

The RAM 4 stores various types of data used for displaying an image in the display region 100. The RAM 4 has an image storage region A, a processed image storage region B, and a previous image storage region C. Each storage region includes matrix-like storage regions corresponding to the respective pixel 110 arranged in m rows×n columns. The image storage region A is a region for storing image data read from the VRAM 3. The processed image storage region B is a region for storing processed image data obtained by processing image data stored in the image storage region A. The previous image storage region C is a region for storing image data stored in the processed image storage region B upon detecting that the content of the VRAM 3 is re-written.

In the display region 100, a plurality of scanning lines 112 extend in the row (X) direction, and a plurality of data lines 114 extend in the column (Y) direction in a state of being electrically insulated from the scanning lines 112. The pixels 110 are arranged corresponding to the respective intersections between the scanning lines 112 and the data lines 114. If the number of rows of the scanning lines 112 is taken as "m" and the number of columns of the data lines 114 is taken as "n" for the sake of convenience, the pixels 110 are in a matrix of m rows (along the vertical direction)×n columns (along the horizontal direction) to form the display region 100.

Figure 2:
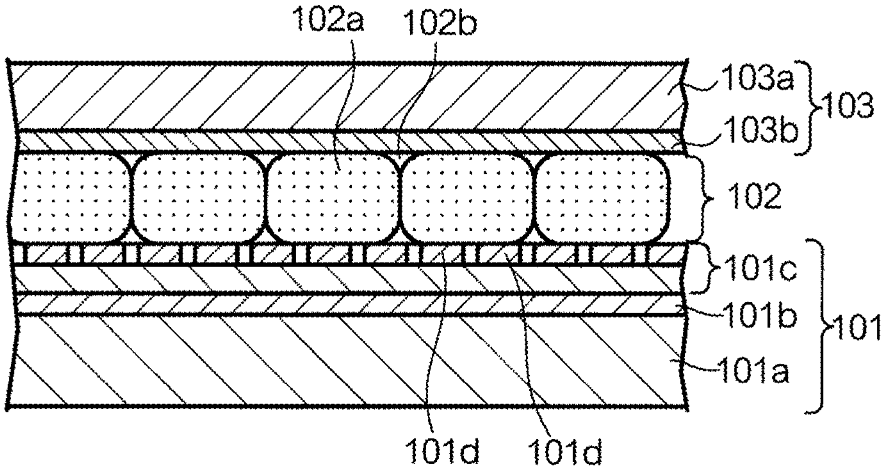
FIG. 2 is a view showing a cross-section of a display region 100.

FIG. 2 is a view showing a cross-section of the display region 100. As shown in FIG. 2, the display region 100 is configured roughly by a first substrate 101, an electrophoretic layer 102, and a second substrate 103. The first substrate 101 is a substrate in which a circuit layer is formed on an insulating and flexible substrate 101*a*. In this embodiment, the substrate 101*a* is made of polycarbonate. The material of the substrate 101*a* is not limited to polycarbonate, and other light, flexible, elastic, and insulating resin materials may be used. Alternatively, the substrate 101*a* may be made of non-flexible glass. A bonding layer 101*b* is provided on a surface of the substrate 101*a*, and a circuit layer 101*c* is stacked on a surface of the bonding layer 101*b*.

The circuit layer 101*c* has the plurality of scanning lines 112 extending in the row direction and the plurality of data lines 114 extending in the column direction. Furthermore, the circuit layer 101*c* has pixel electrodes 101*d* (first electrodes) corresponding to the respective intersections between the scanning lines 112 and the data lines 114.

The electrophoretic layer 102, which is an exemplary electro-optical material, is configured by a binder 102*b* and a plurality of microcapsules 102*a* fixed by the binder 102*b*, and is formed on the pixel electrodes 101*d*. Note that a bonding layer made of an adhesive may be provided between the microcapsules 102*a* and the pixel electrodes 101*d*.

There is no specific limitation on the material of the binder 102*b*, as long as it has a good affinity for the microcapsules 102*a*, an excellent adhesion with the electrodes, and sufficient insulating properties. Each of the microcapsules 102*a* contains a dispersion medium and electrophoretic particles. The microcapsules 102*a* are preferably made of a flexible material such as a gum arabic-gelatin compound or a urethane compound.

Examples of the dispersion medium include water, alcohol-based solvent (methanol, ethanol, isopropanol, butanol, octanol, methyl cellosolve, etc.), esters (ethyl acetate, butyl acetate, etc.), ketones (acetone, methyl ethyl ketone, methyl isobutyl ketone, etc.), aliphatic hydrocarbon (pentane, hexane, octane, etc.), alicyclic hydrocarbon (cyclohexane, methylcyclohexane, etc.), aromatic hydrocarbon (benzene, toluene, benzenes having long-chain alkyl groups (xylene, hexylbenzene, heptylbenzene, octylbenzene, nonylbenzene, decylbenzene, undecylbenzene, dodecylbenzene, tridecylbenzene, tetradecylbenzene, etc.)), halogenated hydrocarbon (methylene chloride, chloroform, carbon tetrachloride, 1,2-dichloroethane, etc.), and carboxylate, and further include other oils. The dispersion medium may be made of these materials used alone or in a combination, or may further contain surfactant or the like.

The electrophoretic particles are particles (polymer or colloid) that are moved in accordance with an electric field in the dispersion medium. In this embodiment, white electrophoretic particles and black electrophoretic particles are contained in the microcapsules 102*a*. The black electrophoretic particles are made of, for example, black pigment such as aniline black or carbon black, and are positively charged in this embodiment. The white electrophoretic particles are made of, for example, white pigment such as titanium dioxide or aluminum oxide, and are negatively charged in this embodiment.

The second substrate 103 is configured by a film 103*a* and a transparent common electrode layer 103*b* (second electrode) formed on a lower face of the film 103*a*. The film 103*a* has a function of sealing and protecting the electrophoretic layer 102, and is made of, for example, polyethylene terephthalate. The film 103*a* is a transparent insulating film. The common electrode layer 103*b* is made of, for example, a transparent conductive layer such as an indium oxide film (ITO film).

Figure 3:
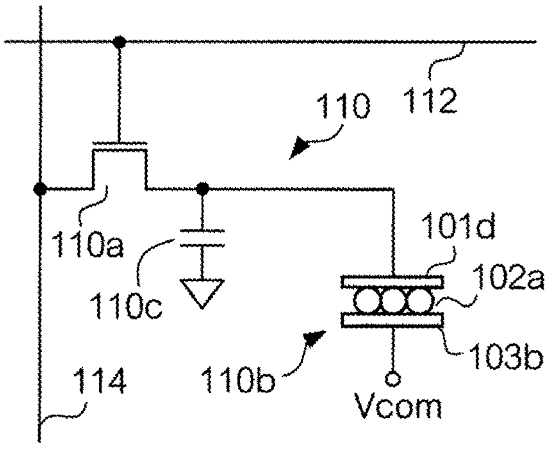
FIG. 3 is a diagram showing an equivalent circuit of a pixel 110.

FIG. 3 is a diagram showing an equivalent circuit of the pixel 110. In this embodiment, in order to identify each scanning line 112, the scanning lines 112 shown in FIG. 1 may be referred to as lines in the 1st, 2nd, 3rd, . . . , (m−1)-th, and m-th rows sequentially from above. In a similar manner, in order to identify each data line 114, the data lines 114 shown in FIG. 1 may be referred to as lines in the 1st, 2nd, 3rd, . . . , (n−1)-th, and n-th columns sequentially from the left.

FIG. 3 shows an equivalent circuit of the pixel 110 corresponding to the intersection between the scanning line 112 in the i-th row and the data line 114 in the j-th column. Since the pixels 110 corresponding to the intersections between the other data lines 114 and the other scanning lines 112 have the same configuration as that in this drawing, the equivalent circuit of the pixel 110 corresponding to the intersection between the scanning line 112 in the i-th row and the data line 114 in the j-th column will be described hereinafter as a representative example, and a description of equivalent circuits of the other pixels 110 is omitted.

As shown in shown in FIG. 3, each pixel 110 has an n-channel thin film transistor (hereinafter, referred to simply as "TFT") 110*a*, a display element 110*b*, and an auxiliary capacitor 110*c*. In the pixel 110, the TFT 110*a* has a gate electrode that is connected to the scanning line 112 in the i-th row, a source electrode that is connected to the data line 114 in the j-th column, and a drain electrode that is connected to the pixel electrode 101*d* at one end of the display element 110*b* and one end of the auxiliary capacitor 110*c*. The auxiliary capacitor 110*c* is configured such that a dielectric layer is held between a pair of electrodes formed in the circuit layer 101*c*. The electrode at the other end of the auxiliary capacitor 110*c* is set to a voltage that is common between pixels. The pixel electrode 101*d* faces the common electrode layer 103*b*, and the electrophoretic layer 102 containing the microcapsules 102*a* is held between the pixel electrode 101*d* and the common electrode layer 103*b*. Accordingly, in an equivalent circuit, the display element 110*b* is shown as a capacitor in which the electrophoretic layer 102 is held between the pixel electrode 101*d* and the common electrode layer 103*b*. The display element 110*b* holds (stores) a voltage between the electrodes, and performs display according to the direction of an electric field generated by the held voltage. In this embodiment, an external circuit not shown in the drawing applies a common voltage Vcom to the electrode at the other end of the auxiliary capacitor 110*c* and the common electrode layer 103*b* in each pixel 110.

Returning to FIG. 1, the scanning line drive circuit 130 is connected to the scanning lines 112 of the display region 100. The scanning line drive circuit 130 selects the scanning lines 112 in the order of the 1st, 2nd, . . . , and m-th row, according to the control by the controller 5, and supplies a High-level signal to a selected scanning line 112 and supplies a Low-level signal to the other scanning lines 112 that are not selected.

The data line drive circuit 140 is connected to the data lines 114 in the display region, and supplies data signals to the data lines 114 in the respective columns according to the display content for one row of the pixels 110 connected to the selected scanning line 112.

In a period from when the scanning line drive circuit 130 selects the scanning line 112 in the 1st row to when the scanning line drive circuit 130 ends the selection of the scanning line 112 in the m-th row (hereinafter, referred to as "frame period" or simply as "frame"), each scanning line 112 is selected once, and a data signal is supplied to each pixel 110 once per frame.

When the scanning line 112 is turned to high, the TFTs 110*a* whose gates are connected to the scanning line 112 are turned on, and the pixel electrodes 101*d* are connected to the data lines 114. If a data signal is supplied to the data lines 114 when the scanning line 112 is high, the data signal is applied, via the TFTs 110*a* that are on, to the pixel electrodes 101*d*. When the scanning line 112 is turned to low, the TFTs 110*a* are turned off, but the voltage applied by the data signal to the pixel electrodes 101*d* is accumulated in the auxiliary capacitors 110*c*, and the electrophoretic particles move in accordance with the potential difference (voltage) between the potential of the pixel electrodes 101*d* and the potential of the common electrode layer 103*b*.

For example, if the pixel electrode 101*d* has a voltage of +15 V (second voltage) relative to the voltage Vcom of the common electrode layer 103*b*, negatively charged white electrophoretic particles move toward the pixel electrode 101*d*, and positively charged black electrophoretic particles move toward the common electrode layer 103*b*, so that the pixel 110 displays black color. Also, if the pixel electrode 101*d* has a voltage of −15 V (first voltage) relative to the voltage Vcom of the common electrode layer 103*b*, positively charged black electrophoretic particles move toward the pixel electrode 101*d*, and negatively charged white electrophoretic particles move toward the common electrode layer 103*b*, so that the pixel 110 displays white color. Note that the voltage of the pixel electrode 101*d* is not limited to those described above, and may be voltages other than +15 V or −15 V as long as they are plus (positive) voltages or minus (negative) voltages relative to the voltage Vcom of the common electrode layer 103*b*.

In this embodiment, when changing the display state of each pixel 110 from white (low tone), corresponding to a first tone where the reflectance ratio of light is maximum, to black (high tone), corresponding to a second tone where the reflectance ratio of light is minimum, or when changing the display state from black to white, the display state may be changed not by supplying a data signal to the pixel 110 only in one frame but by supplying a data signal to the pixel 110 over a plurality of frames. The reason for this is that, when changing the display state, the movement amount of the black electrophoretic particles may be small with a potential difference supplied to the electrophoretic particles only in one frame, so that a target tone may not be reached. The same is applied to the white electrophoretic particles when changing the display state from black to white. Thus, for example, when changing the display state of the pixel 110 from white where the reflectance ratio of light is maximum to black where the reflectance ratio of light is minimum, a data signal for causing the pixel 110 to display black color is supplied to the pixel 110 over a plurality of frames. Furthermore, when changing the display state of the pixel 110 from black to white, a data signal for causing the pixel 110 to display white color is supplied to the pixel 110 over a plurality of frames. In this specification, a "writing operation" is a sequence of supplying a data signal to a pixel in order to change the display state of the pixel to a state of displaying a desired tone, or a sequence of applying a voltage between the common electrode layer 103*b* and the pixel electrode 101*d* based on that supply sequence.

Furthermore, in this embodiment, one pixel 110 in one frame may have the pixel electrode 101*d* set to positive such that its potential is higher than that of the common electrode layer 103*b*, and, furthermore, another pixel 110 in the same frame may have the pixel electrode 101*d* set to negative such that its potential is lower than that of the common electrode layer 103*b*. That is to say, drive that can select both a positive pixel electrode 101*d* and a negative pixel electrode 101*d* relative to the common electrode layer 103*b* in one frame (hereinafter, referred to as bipolar drive) is possible. More specifically, in one frame, the pixel electrode 101*d* of the pixel 110 whose tone is to be changed to a higher tone (toward the second tone) is set to positive, and the pixel electrode 101*d* of the pixel 110 whose tone is to be changed to a lower tone (toward the first tone) is set to negative. Note that, when the black electrophoretic particles are negatively charged and the white electrophoretic particles are positively charged, the pixel electrode 101*d* of the pixel 110 whose tone is to be changed to a higher tone (toward the second tone) may be set to negative, and the pixel electrode 101*d* of the pixel 110 whose tone is to be changed to a lower tone (toward the first tone) may be set to positive.

Figures 4, 5:
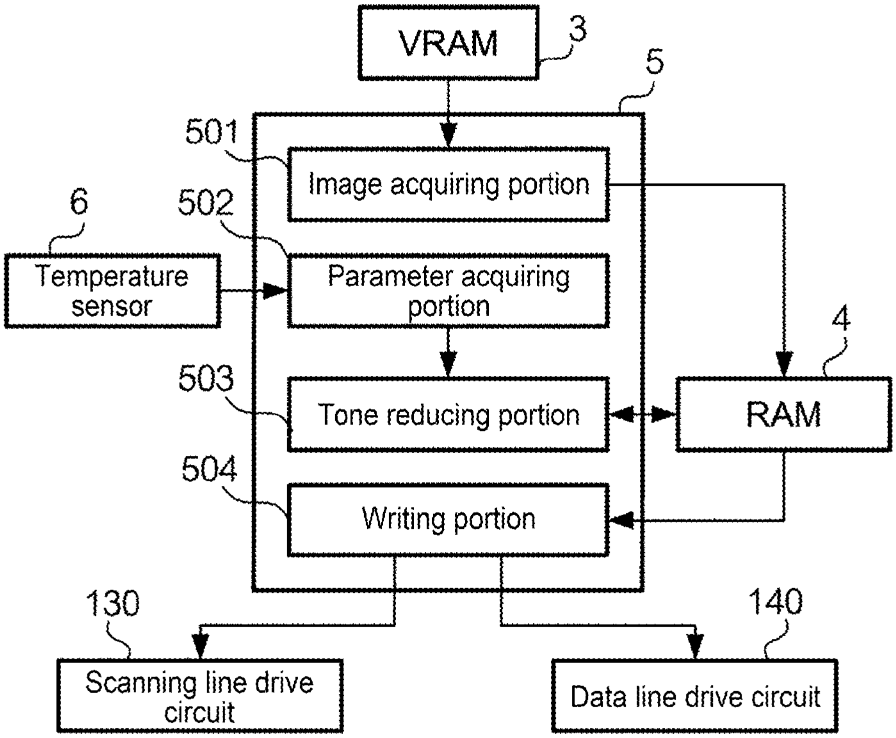
FIG. 4 is a block diagram showing the configuration of functions that can be realized by a controller 5.
FIG. 5 is a diagram showing an exemplary temperature table.

Next, the configuration of the controller 5 will be described. FIG. 4 is a block diagram showing the functions realized by the controller 5 of this embodiment. In the controller 5, an image acquiring portion 501, a parameter acquiring portion 502, a tone reducing portion 503, and a writing portion 504 are realized. Note that the blocks realized in the controller 5 may be realized by hardware, or may be realized by providing the controller 5 with a CPU, and causing the CPU to execute a program.

The image acquiring portion 501 is a block that acquires image data (first image data) stored in the VRAM 3, and stores the acquired image data in the image storage region A of the RAM 4. The image acquiring portion 501 stores image data stored in the VRAM 3, in the image storage region A of the RAM 4, and then stores image data stored in the processed image storage region B, in the previous image storage region C.

The parameter acquiring portion 502 is a block that acquires a parameter for determining a tone value after the reduction of the number of tones, in processing that reduces the number of tones, which will be described later. In this embodiment, a signal output from the temperature sensor 6 is acquired as the parameter.

The tone reducing portion 503 is a block that reduces the number of tones in the image data stored in the image storage region A. The tone reducing portion 503 reduces the number of tones to change image data in 256 tones to image data in four tones consisting of black, dark gray, light gray, and white. In this embodiment, the tone values for dark gray and light gray that are intermediate tones are changed in accordance with the temperature detected by the temperature sensor 6.

Specifically, the tone reducing portion 503 stores a temperature table in which temperature ranges are associated with tone values for dark gray and light gray. FIG. 5 is a diagram showing an exemplary temperature table. In the case of a temperature table shown in FIG. 5, a temperature range of “less than 20° C.” is associated with a tone value C1 for dark gray of 69 and with a tone value C2 for light gray of 115. Furthermore, a temperature range of “20° C. or more and less than 30° C.” is associated with a tone value C1 for dark gray of 85 and with a tone value C2 for light gray of 170. A temperature range of “30° C. or more” is associated with a tone value C1 for dark gray of 102 and with a tone value C2 for light gray of 205.

The tone reducing portion 503 specifies the temperature detected by the temperature sensor 6, based on the signal acquired by the parameter acquiring portion 502. The tone reducing portion 503 acquires, from the temperature table, a tone value C1 and a tone value C2 associated with a temperature range including the specified temperature, and reduces the number of tones using the acquired tone values.

Hereinafter, the processing in which the tone reducing portion 503 reduces the number of tones will be described. The tone reducing portion 503 stores a dithermatrix in 16 rows×16 columns, and the dithermatrix has thresholds for binarizing image data stored in the image storage region A. Each of the thresholds is any one of the values 0 to 255. The tone reducing portion 503 generates image data representing a tone value after the reduction of the number of tones, according to the following arithmetic expression, using the dithermatrix and the acquired tone value C1 and tone value C2.

```
data_2[x,y]=data_1[x,y]+dithermatrix[x % 16,y %
    16]*C1/255+(255−C1)<256?0:

(data_1[x,y]+dithermatrix[x % 16,y % 16]*(C2−C1)/
    255+(255−C2)<256?C1:

(data_1[x,y]+dithermatrix[x % 16,y % 16]*(255−C2)/
    255<256?C2:255))
```

This arithmetic expression is expressed using operators of the C language, which is an exemplary programming language. In the arithmetic expression, the image data stored in the image storage region A is taken as data_1, and the image data after the reduction of the number of tones is taken as data_2. Furthermore, [x,y] represents the coordinates of tone data of pixels stored in a matrix in the storage regions. Furthermore, “dithermatrix” represents the dithermatrix, and x and y in [x % 16, y % 16] represent the coordinates of the thresholds arranged in the dithermatrix. According to the arithmetic expression, for example, the tone of a pixel at the 20th row and 20th column is obtained using the threshold at the 4th row and 4th column in the dithermatrix. The tone reducing portion 503 sequentially changes the values of x and y in the arithmetic expression, thereby generating, for each pixel, image data representing a tone value after the reduction of the number of tones, and stores the generated image data (second image data) in the processed image storage region B.

The writing portion 504 controls the scanning line drive circuit 130 and the data line drive circuit 140 to apply the above-described first voltage or second voltage to the pixel electrodes 101*d* of each pixel 110 based on the image data stored in the processed image storage region B and the previous image storage region C.

The writing portion 504 stores an application number table shown in FIG. 6. The application number table shown in FIG. 6 has the number of times of application of a voltage to a pixel when changing the tone of the pixel. The application number table is provided for each temperature range. FIG. 6(*a*) is used when the temperature specified by the tone reducing portion 503 is less than 20° C., FIG. 6(*b*) is used when the temperature is 20° C. or more and less than 30° C., and FIG. 6(*c*) is used when the temperature is 30° C. or more.

The writing portion 504 acquires a tone value before the change from the previous image storage region C, and acquires a tone value after the change from the processed image storage region B. According to the application number table in FIG. 6, in this embodiment, if the temperature is less than 20° C., the tone value before the change is 0 (black), and the tone value after the change is 255 (white), the tone of the pixel can be changed from black to white by applying a voltage of −15 V relative to the voltage Vcom of the common electrode layer 103*b* to the pixel electrodes 101*d* nine times. Furthermore, if the tone value before the change is 0 (black) and the tone value after the change is C2 (light gray), the tone of the pixel can be changed to the tone value C2 by applying a voltage of −15 V relative to the voltage Vcom to the pixel electrodes 101*d* four times. If the tone value before the change is 0 (black) and the tone value after the change is C1 (dark gray), the tone of the pixel can be changed to the tone value C1 by applying a voltage of −15 V relative to the voltage Vcom to the pixel electrodes 101*d* once. If the tone value before the change is 255 (white) and the tone value after the change is 0 (black), the tone of the pixel can be changed from white to black by applying a voltage of +15 V relative to the voltage Vcom to the pixel electrodes 101*d* nine times.

That is to say, the tone of the pixel changes in a discrete manner according to the number of times of application of a voltage of −15 V or +15 V.

Operation in this Embodiment

Figure 7:
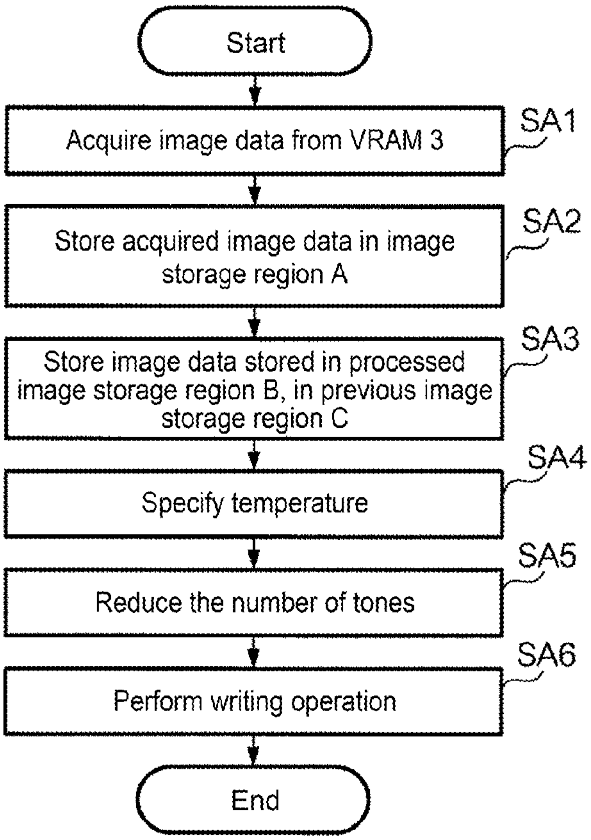
FIG. 7 is a flowchart showing the flow of processing performed by the controller 5.

Next, an operation in this embodiment will be described. FIG. 7 is a flowchart showing the flow of processing performed by the controller 5. The controller 5 monitors writing of image data into the VRAM 3. If the content of the VRAM 3 is changed, the controller 5 (the image acquiring portion 501) acquires image data (first image data) stored in the VRAM 3 (step SA1 (image acquiring step)), and stores the acquired image data in the image storage region A (step SA2). Note that the tone values of the pixels are stored in a matrix corresponding to the respective pixel 110 arranged in m rows×n columns. Furthermore, the controller 5 stores the image data stored in the processed image storage region B (second image data) in the previous image storage region C (step SA3). With step SA3, image data of an image displayed at that time is stored in the previous image storage region C.

Next, the controller 5 (the parameter acquiring portion 502) acquires a signal output from the temperature sensor 6 (parameter acquiring step). Then, the controller 5 (the tone reducing portion 503) specifies the temperature detected by the temperature sensor 6, based on the acquired signal (step SA4). After the temperature is specified, the controller 5 (the tone reducing portion 503) reduces the number of tones in the image data stored in the image storage region A, according to the specified temperature (step SA5 (tone reducing step)).

First, the controller 5 acquires, from the temperature table, a tone value C1 and a tone value C2 associated with a temperature range including the temperature specified in step SA4. If the specified temperature is less than 20° C., the controller 5 acquires a tone value C1 of 69 and a tone value C2 of 115, which are values associated with a temperature of less than 20° C. Furthermore, if the specified temperature is 20° C. or more and less than 30° C., the controller 5 acquires a tone value C1 of 85 and a tone value C2 of 170. If the specified temperature is 30° C. or more, the controller 5 acquires a tone value C1 of 102 and a tone value C2 of 205.

Next, the controller 5 substitutes the acquired tone value C1 and tone value C2 for C1 and C2 of the above-described arithmetic expression, and substitutes the tone value of each pixel in the first image data stored in the RAM 4 for the arithmetic expression. Accordingly, second image data is generated in which the tone value of each pixel in the first image data has been replaced by one of the values 0, C1, C2, and 255. The controller 5 stores the generated second image data in the processed image storage region B. If the temperature is less than 20° C., the tone value after the change is one of the values 0, 69, 115, and 255. Furthermore, if the temperature is 20° C. or more and less than 30° C., the tone value after the change is one of the values 0, 85, 170, and 255. If the temperature is 30° C. or more, the tone value after the change is one of the values 0, 102, 205, and 255. That is to say, image data in 256 tones is changed to image data in four tones with the processing that reduces the number of tones, and, furthermore, the tone values for intermediate tones after the reduction of the number of tones change in accordance with the temperature.

After the processing that reduces the number of tones is ended, the controller 5 (the writing portion 504) performs a writing operation, using the image data stored in the processed image storage region B and the image data stored in the previous image storage region C (step SA6 (writing step)).

Specifically, the controller 5 acquires, for each pixel, the tone value stored in the processed image storage region B and the tone value stored in the previous image storage region C. The controller 5 determines, for each pixel, the number of times of application of a voltage with reference to the table in FIG. 6, taking the tone value acquired from the processed image storage region B as the tone value after the change and the tone value acquired from the previous image storage region C as the tone value before the change. After the number of times of application of a voltage is determined, the controller 5 specifies whether the tone of the pixel is to be changed toward white or toward black, based on the tone value stored in the processed image storage region B and the tone value stored in the previous image storage region C. When changing the tone of the pixel toward white, the controller 5 applies a voltage of −15 V relative to the voltage Vcom to the pixel electrode 101*d* the determined number of times. When changing the tone of the pixel toward black, the controller 5 applies a voltage of +15 V relative to the voltage Vcom to the pixel electrode 101*d* the determined number of times.

In this embodiment, when changing the tone of the pixel from 0 (the normalized reflectance ratio of light 0%) to C1 (dark gray), a voltage of −15 V relative to the voltage Vcom to the pixel electrode 101*d* is applied only once. The tone of the pixel after the application of the voltage is 69 (the reflectance ratio 27%) when the temperature is less than 20° C., 85 (the reflectance ratio 33%) when the temperature is 20° C. or more and less than 30° C., and 102 (the reflectance ratio 40%) when the temperature is 30° C. or more. That is to say, when the temperature is less than 20° C., or is 30° C. or more, the reflectance ratio cannot be 33% with application of the voltage once, which is a value for dark gray obtained by making differences between tones equal and reducing the number of tones into four. In this case, with application of the voltage twice, the electrophoretic particles have a reflectance ratio of more than 33%.

When the temperature is less than 20° C., or is 30° C. or more, if the number of tones is reduced while setting the tone value C1 for dark gray to 85 corresponding to the reflectance ratio 33% in the case of reducing the number of tones into four, a difference occurs between the tones that are actually displayed in pixels and the tones of an image after the reduction of the number of tones, and the quality in displaying the tones deteriorates.

However, in this embodiment, the tone value C1 for dark gray in the case of reducing the number of tones into four is set according to the values of tones that are displayed at the respective temperatures, and, thus, no difference occurs between the tones that are actually displayed in pixels and the tones of an image after the reduction of the number of tones, and an image can be displayed without a deterioration of the quality in displaying the tones. In a similar manner, also in the case of light gray, the tone value C2 for light gray in the case of reducing the number of tones into four is set according to the values of tones that are displayed at the respective temperatures, and, thus, no difference occurs between the tones that are actually displayed in pixels and the tones of an image after the reduction of the number of tones, and an image can be displayed without a deterioration of the quality in displaying the tones.

Note that, in the display apparatus 1000, the tone values for dark gray and light gray may change from apparatus to apparatus due to variations in the viscosity of the dispersion medium or the like between apparatuses in the manufacture, even when a voltage is applied the same number of times at the same temperature.

In this case, the number of times of application of a voltage with which dark gray with a reflectance ratio in a pixel close to 33% is obtained and the number of times of application of a voltage with which light gray with a reflectance ratio in a pixel close to 66% is obtained are measured for each apparatus, so that the application number table is generated for each apparatus. Furthermore, the tone value C1 for dark gray and the tone value C2 for light gray at that time are measured, and the measured tone values are stored in the temperature table in the manufacture.

In this manner, according to the configuration in which the number of times of application of a voltage, the tone value C1, and the tone value C2 are set for each apparatus, even if there are variations in the tones that can be displayed by apparatuses, an image can be displayed by each apparatus without a deterioration of the quality in displaying the tones.

Electronic Equipment

Figure 8:
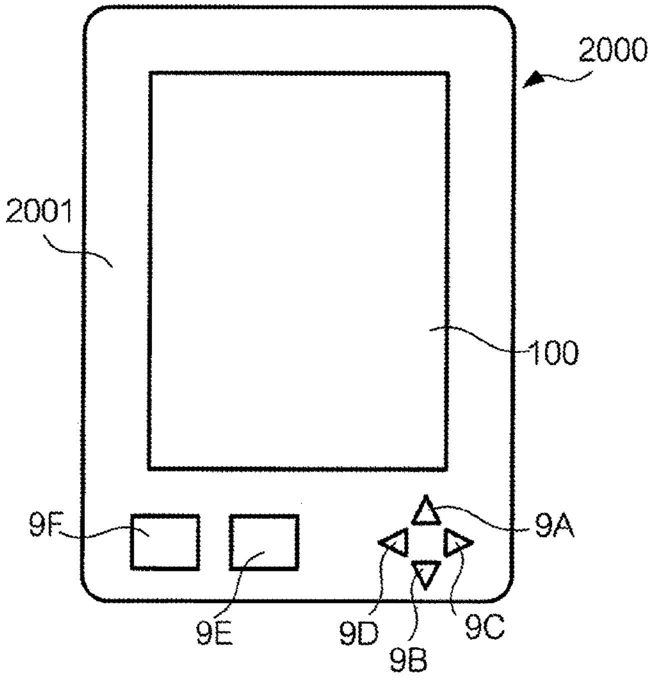
FIG. 8 is an external view of an electronic book reader 2000.

Next, exemplary electronic equipment to which the display apparatus 1000 according to the foregoing embodiment has been applied will be described. FIG. 8 is an external view of an electronic book reader using the display apparatus 1000 according to the foregoing embodiment. An electronic book reader 2000 includes a plate-like frame 2001, buttons 9A to 9F, and the electro-optical device 1, the control portion 2, the VRAM 3, and the RAM 4 according to the foregoing embodiment. The display region 100 is exposed on the electronic book reader 2000. In the electronic book reader 2000, contents of an electronic book are displayed in the display region 100, and pages of the electronic book are turned by operating the buttons 9A to 9F. Note that the electro-optical device 1 according to the foregoing embodiment can be applied to other types of electronic equipment such as clocks, electronic paper, electronic notes, calculators, portable telephones, and the like.

Modified Examples

Although an embodiment of the invention was described above, the invention is not limited to the foregoing embodiment, and can be embodied in other various forms. For example, the invention can be embodied by modifying the embodiment as follows. Note that the embodiment and the following modified examples may be combined.

Although the foregoing embodiment described an example in which an electro-optical device has the electrophoretic layer 102, there is no limitation to this. There is no limitation on the electro-optical device, as long as writing for changing the display state of a pixel from a first display state to a second display state is performed through a writing operation that applies a voltage a plurality of times. For example, the electro-optical device may be those using an electronic liquid powder as the electro-optical material.

In the foregoing embodiment, the number of tones is reduced to change image data in 256 tones to image data in four tones, but the number of tones after the reduction of the number of tones is not limited to four. For example, the number of tones after the reduction may be three, or may be five or more. Note that, if the number of tones after the reduction is not four, the number of columns of the temperature table may be increased or decreased as appropriate according to the number of intermediate tones. Furthermore, the number of rows and the number of columns of the application number table may be increased or decreased as appropriate according to the number of intermediate tones.

Furthermore, the number of tones of an image before the reduction of the number of tones is not limited to 256, and it may be less than 256, or may be 257 or more.

In the foregoing embodiment, the number of temperature ranges is three, but there is no limitation to this. For example, the number of temperature ranges may be two, or may be four or more. Note that, if the number of temperature ranges is different from that in the foregoing embodiment, the number of rows of the temperature table may be increased or decreased as appropriate. Furthermore, the number of application number tables may be increased or decreased as appropriate according to the number of temperature ranges.

In the electronic equipment including the display apparatus 1000, the tone value C1 and the tone value C2 of the temperature table may be changed with operations of the user. For example, in the electronic book reader 2000, the tone value C1 and the tone value C2 may be input as parameters for determining a tone value after the reduction of the number of tones, by the user operating the buttons 9A to 9F, and the parameter acquiring portion 502 may acquire the input tone value C1 and tone value C2. Then, the tone reducing portion 503 may reduce the number of tones using the tone value C1 and the tone value C2 of the input parameters.

In the electronic equipment including the display apparatus 1000, the number of times of voltage application for setting the tone to dark gray and the number of times of voltage application for setting the tone to light gray may be set with operations of the user. For example, in the electronic book reader 2000, the values of the application number table may be changed by the user operating the buttons 9A to 9F.

In the foregoing embodiment, if a plurality of tones of dark gray and light gray can be selected, tones of dark gray and light gray may be selected such that a difference between the tones of dark gray and light gray is large.

For example, assume the case in which, a reflectance ratio of 0% is changed to a reflectance ratio of 15% by applying a voltage of −15 V once, is changed to a reflectance ratio of 35% by applying the voltage twice, is changed to a reflectance ratio of 50% by applying the voltage three times, is changed to a reflectance ratio of 70% by applying the voltage four times, is changed to a reflectance ratio of 90% by applying the voltage five times, and is changed to a reflectance ratio of 100% by applying the voltage six times. In this case, selecting the state in which the reflectance ratio is 15% as dark gray and the state in which the reflectance ratio is 90% as light gray is more preferable to selecting the state in which the reflectance ratio is 35% as dark gray and the state in which the reflectance ratio is 70% as light gray.

If a voltage for changing the tone toward white is applied after a voltage for changing the tone toward black is applied, due to the characteristics of electrophoretic display apparatuses, the movement amounts of the electrophoretic particles may not be the same and the tone may not return to the original tone. The same is applied to a case in which a voltage for changing the tone toward black is applied after a voltage for changing the tone toward white is applied. Accordingly, if dark gray and light gray are alternately and repeatedly displayed, dark gray may be shifted toward white and light gray may be shifted toward black. In this case, if the difference between the tones of dark gray and light gray is small, the reflectance ratio of the displayed image is higher than that of light gray even when dark gray is intended to be displayed.

On the other hand, if the difference between the tones of dark gray and light gray is set to be large as described above, a voltage has to be applied a larger number of times until the difference between the tones of dark gray and light gray becomes small, and, thus, the reflectance ratio of dark gray in a displayed image can be prevented from being larger than the reflectance ratio of light gray.

This application claims priority from Japanese Patent Application No. 2012-067172 filed in the Japanese Patent Office on Mar. 23, 2012, the entire disclosure of which is hereby incorporated by reference.

The invention claimed is:

1. A device for controlling a display apparatus including a plurality of first electrodes provided for respective pixels, a second electrode disposed facing the plurality of first electrodes, and an electro-optical material disposed between the plurality of first electrodes and the second electrode, in which tones of the pixels change in a discrete manner according to the number of times of application of a voltage to the first electrodes, the device controlling the display apparatus in which the electro-optical material is held between a first substrate provided with the plurality of first electrodes and a second substrate provided with the second electrode, a plurality of pixels are configured by the plurality of first electrodes, the electro-optical material, and the second electrode, and tones of the pixels change in a discrete manner according to the number of times of application of a voltage to the first electrodes, the device comprising:

an image acquiring portion that acquires first image data containing a tone value of each pixel;

a parameter acquiring portion that acquires a parameter for determining a tone used to display an image, from among the tones of the pixels that change in a discrete manner; and a tone reducing portion that determines, in a case of reducing the number of tones to a number of tones smaller than that of the first image data, each tone value after the reduction of the number of tones, according to the parameter acquired by the parameter acquiring portion, and generates second image data in which the number of tones in the first image data acquired by the image acquiring portion has been reduced based on the determined tone value, wherein in a case where the number of tones after the reduction of the number of tones is smaller than the number of tones that can be selected in the display apparatus, a smallest difference between the tones after the reduction of the number of tones is larger than a smallest difference between the tones that can be selected in the display apparatus.

2. The device for controlling the display apparatus according to claim 1, wherein the tone value after the reduction of the number of tones is determined for each display apparatus.

3. A display apparatus including a plurality of first electrodes provided for respective pixels, a second electrode disposed facing the plurality of first electrodes, and an electro-optical material disposed between the plurality of first electrodes and the second electrode, in which tones of the pixels change in a discrete manner according to the number of times of application of a voltage to the first electrodes, comprising:

an image acquiring portion that acquires first image data containing a tone value of each pixel;

a parameter acquiring portion that acquires a parameter for determining a tone used to display an image, from among the tones of the pixels that change in a discrete manner;

a tone reducing portion that determines, in a case of reducing the number of tones to a number of tones smaller than that of the first image data, each tone value after the reduction of the number of tones, according to the parameter acquired by the parameter acquiring portion, and generates second image data in which the number of tones in the first image data acquired by the image acquiring portion has been reduced based on the determined tone value; and a writing portion that changes the tone of the pixel to a tone of the tone value specified by the second image data generated by the tone reducing portion, wherein, in a case of changing the tone of the pixel from a second tone toward a first tone, a first writing operation is performed that applies a first voltage to the first electrode of the pixel once or a plurality of times, and, in a case of changing the tone of the pixel from the first tone toward the second tone, a second writing operation is performed that applies a second voltage having a polarity different from that of the first voltage to the first electrode of the pixel once or a plurality of times, and in a case where the number of tones after the reduction of the number of tones is smaller than the number of tones that can be selected in the display apparatus, a smallest difference between the tones after the reduction of the number of tones is larger than a smallest difference between the tones that can be selected in the display apparatus.

4. A method for controlling a display apparatus including a plurality of first electrodes provided for respective pixels, a second electrode disposed facing the plurality of first electrodes, and an electro-optical material disposed between the plurality of first electrodes and the second electrode, in which tones of the pixels change in a discrete manner according to the number of times of application of a voltage to the first electrodes, the method comprising:

an image acquiring step of acquiring first image data containing a tone value of each pixel;

a parameter acquiring step of acquiring a parameter for determining a tone used to display an image, from among the tones of the pixels that change in a discrete manner;

a tone reducing step of determining, in a case of reducing the number of tones to a number of tones smaller than that of the first image data, each tone value after the reduction of the number of tones, according to the parameter acquired in the parameter acquiring step, and generating second image data in which the number of tones in the first image data acquired in the image acquiring step has been reduced based on the determined tone value; and a writing step of changing the tone of the pixel to a tone of the tone value specified by the second image data generated in the tone reducing step, wherein, in a case of changing the tone of the pixel from a second tone toward a first tone, a first writing operation is performed that applies a first voltage to the first electrode of the pixel once or a plurality of times, and, in a case of changing the tone of the pixel from the first tone toward the second tone, a second writing operation is performed that applies a second voltage having a polarity different from that of the first voltage to the first electrode of the pixel once or a plurality of times, and in a case where the number of tones after the reduction of the number of tones is smaller than the number of tones that can be selected in the display apparatus, a smallest difference between the tones after the reduction of the number of tones is larger than a smallest difference between the tones that can be selected in the display apparatus.

5. An electronic equipment comprising the display apparatus according to claim 3.

6. The device for controlling a display apparatus, according to claim 1, wherein the parameter acquiring portion acquires data indicating a temperature as the parameter, and the tone reducing portion determines each tone value after the reduction of the number of tones, according to the temperature indicated by the data acquired by the parameter acquiring portion.

* * * * *